United States Patent
Shih

(10) Patent No.: US 7,233,314 B2
(45) Date of Patent: Jun. 19, 2007

(54) NOTEBOOK HAVING COMBINED TOUCH PAD AND CD-ROM DRIVE

(75) Inventor: Ching-Ching Shih, Taipei (TW)

(73) Assignee: Inventec Corporation, Taipei (TW)

( * ) Notice: Subject to any disclaimer, the term of this patent is extended or adjusted under 35 U.S.C. 154(b) by 610 days.

(21) Appl. No.: 10/857,902

(22) Filed: Jun. 2, 2004

(65) Prior Publication Data

US 2006/0007167 A1    Jan. 12, 2006

(51) Int. Cl.
*G09G 5/00* (2006.01)
*G06F 17/00* (2006.01)
*G06F 1/16* (2006.01)

(52) U.S. Cl. .................... 345/156; 361/683; 361/686; 312/223.2; 312/351.9; 463/37; 463/46; 463/47; 700/17; 700/19; 700/83; 700/84; 700/85

(58) Field of Classification Search ........ 345/156–178, 345/905; 312/9.4, 9.9, 9.11, 9.13–9.25, 223.2, 312/304, 351.9; 361/683–686; 463/37, 463/46, 47; 700/17, 19, 83–85
See application file for complete search history.

(56) References Cited

U.S. PATENT DOCUMENTS

| | | | |
|---|---|---|---|
| 6,219,037 B1 * | 4/2001 | Lee | 345/167 |
| 6,429,846 B2 * | 8/2002 | Rosenberg et al. | 345/156 |
| 6,473,296 B2 * | 10/2002 | Amemiya et al. | 361/683 |
| 6,873,521 B2 * | 3/2005 | Landry et al. | 361/681 |
| 6,947,280 B2 * | 9/2005 | Li | 361/685 |
| 2005/0052425 A1 * | 3/2005 | Zadesky et al. | 345/173 |

* cited by examiner

*Primary Examiner*—Henry N Tran
(74) *Attorney, Agent, or Firm*—Bacon & Thomas, PLLC

(57) ABSTRACT

The present invention is to provide a notebook having a mechanism for combining a touch pad and a CD-ROM (or DVD-ROM) drive in which the CD-ROM (or DVD-ROM) drive disposed on the notebook is combined with the touch pad disposed on a top surface of the CD-ROM (or DVD-ROM) drive as a unit in order to eliminate the inconvenience of removing the cable and/or one or more peripheral devices in opening a CD-ROM (or DVD-ROM) drive in the notebook; save precious internal space of the housing of the notebook; and provide an aesthetic, circular touch pad assembly.

5 Claims, 2 Drawing Sheets

NOTEBOOK HAVING COMBINED TOUCH PAD AND CD-ROM DRIVE

FIELD OF THE INVENTION

The present invention relates to notebooks, more particularly to such a notebook having a CD-ROM (or DVD-ROM) drive being combined with a touch pad disposed on a top surface of the CD-ROM (or DVD-ROM) drive as a unit for aesthetic and space saving purposes.

BACKGROUND OF THE INVENTION

The world has come to a new era with information technology being progressed rapidly. Various types of computer-related products are commercially available due to the fast progress in computer science and electronics. The fast development of such new products not only brings a lot of convenience but also is closely associated with our daily life and work. In response to various newly available computer-related products, especially notebook computers (hereinafter called notebooks), people become more critical with respect to the features and/or quality thereof. Thus, whether portable computers (e.g., notebooks) can provide a more convenient and effective service to users will be an indicator to decide whether the manufacturing technology of computer-related products of one country is more advanced than other countries. For notebook, as self-explanatory, means that a computer can be easily opened or closed just like opening or closing a looseleaf notebook. Notebooks are advantageous for being slim, compact, lightweight, and portable. The notebook generally comprises a display, a housing, and at least one hinge coupled between the display and the housing. In an inoperable position the display is rested upon the housing. For using the notebook, a user can pivot the display to position at an optimum angle with respect to the housing. Thereafter, the user can enter data through a keyboard on the housing and the data is then processed by the notebook. Next, information is sent to the display via a cable. Finally, the information is shown on the screen of the display for viewing.

Nowadays, a wide variety of computer software packages are available. Most software packages are designed to run on a window based operating system (e.g., widely used Microsoft Windows). A keyboard comprises a number of direction keys. A user may experience inconvenience and difficulty in manipulating a notebook if the user only uses the direction keys. As such, at least one pointing device is provided on a notebook in addition to the typical keyboard so as to facilitate the manipulation of the notebook by moving or rolling the pointing device around.

Currently, mouse is the most widely employed input device other than the keyboard. Mouse is a pointing device which as defined, means a computer peripheral that allows you to control your computer by moving a pointer on the screen. Moreover, pointing devices similar to mouse are constantly developed and/or improved as time evolves and are widely employed in notebooks. Gradually, such pointing devices become integral parts of a notebook. For example, a pointing device (e.g., touch pad) is one of the most widely employed components in a notebook. A touch pad is advantageous for being ease of manipulation. In short, a user may press the finger(s) on the touch pad and move the touch pad toward a desired direction in the process of controlling the pointing direction of the cursor.

In addition to a mouse port on one side of a well known notebook, typically another port adapted to couple to a cable is provided on the same side. The cable is adapted to interconnect another port and a peripheral device for data transfer. Alternatively, another port adapted to couple to a flash drive is provided. In a case of the ports on the side of the notebook coupled to a mouse, a cable, and a flash drive, a user may remove the mouse, the cable, and the flash drive with difficulty prior to opening a CD-ROM (or DVD-ROM) drive mounted on the same side as the mouse, the cable, and the flash drive ports. Unfortunately, the CD-ROM or DVD-ROM drive may be damaged if sufficient care is not taken in the opening. This is very inconvenient and may cause trouble to a user.

Moreover, as stated above, major notebook manufacturers dedicate to develop all-in-one notebooks. It is understood that the computer market is very competitive. Thus, it is desirable among vast consumers to provide an ergonomic, multifunctional, all-in-one, and convenient notebook having its touch pad and CD-ROM (or DVD-ROM) drive arranged as a unit. By providing such notebooks, one notebook manufacturer is able to beat other rival ones in the very competitive computer market.

SUMMARY OF THE INVENTION

After considerable research and experimentation, a notebook having its touch pad and CD-ROM drive being combined according to the present invention has been devised so as to overcome the above drawbacks of the prior art. The drawbacks are that in a case of the mouse, the cable, and flash drive ports on the side of the notebook coupled to a mouse, a cable, and a flash drive, a user may remove the mouse, the cable, and the flash drive with difficulty prior to opening a CD-ROM drive mounted on the same side as the mouse, the cable, and the flash drive ports. Also, the CD-ROM drive may be damaged if sufficient care is not taken in the opening. Such is very inconvenient and may cause trouble to the user.

One object of the present invention is to provide a notebook having a mechanism for combining a touch pad and a CD-ROM (or DVD-ROM) drive in which the CD-ROM (or DVD-ROM) drive disposed on one side of the notebook in the prior art is removed to combine with the touch pad disposed on a top surface of the CD-ROM (or DVD-ROM) drive as a unit. By utilizing the present invention, advantages including (i) eliminating the inconvenience of removing the cable and/or one or more peripheral devices in opening a CD-ROM (or DVD-ROM) drive in the notebook; (ii) saving precious internal space of the housing of the notebook; and (iii) providing an aesthetic, circular touch pad assembly so as to be more attractive to many potential notebook buyers and thus more competitive in the computer market.

The above and other objects, features and advantages of the present invention will become apparent from the following detailed description taken with the accompanying drawings.

DETAILED DESCRIPTION OF THE PREFERRED EMBODIMENTS

Figure 1:
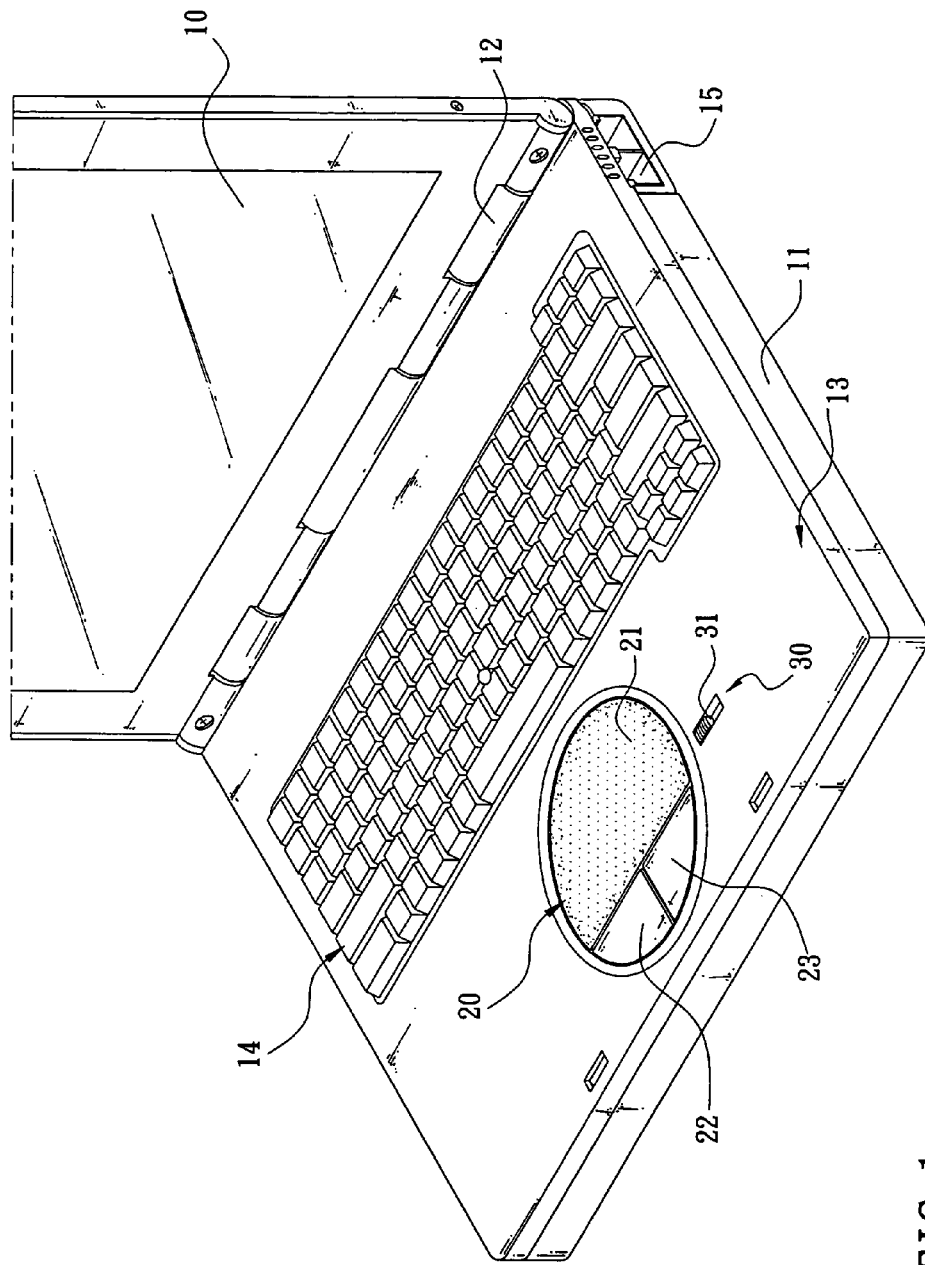
FIG. 1 is a perspective view of a notebook having combined touch pad and CD-ROM (or DVD-ROM) drive according to the invention, where the notebook is open.
Figure 2:
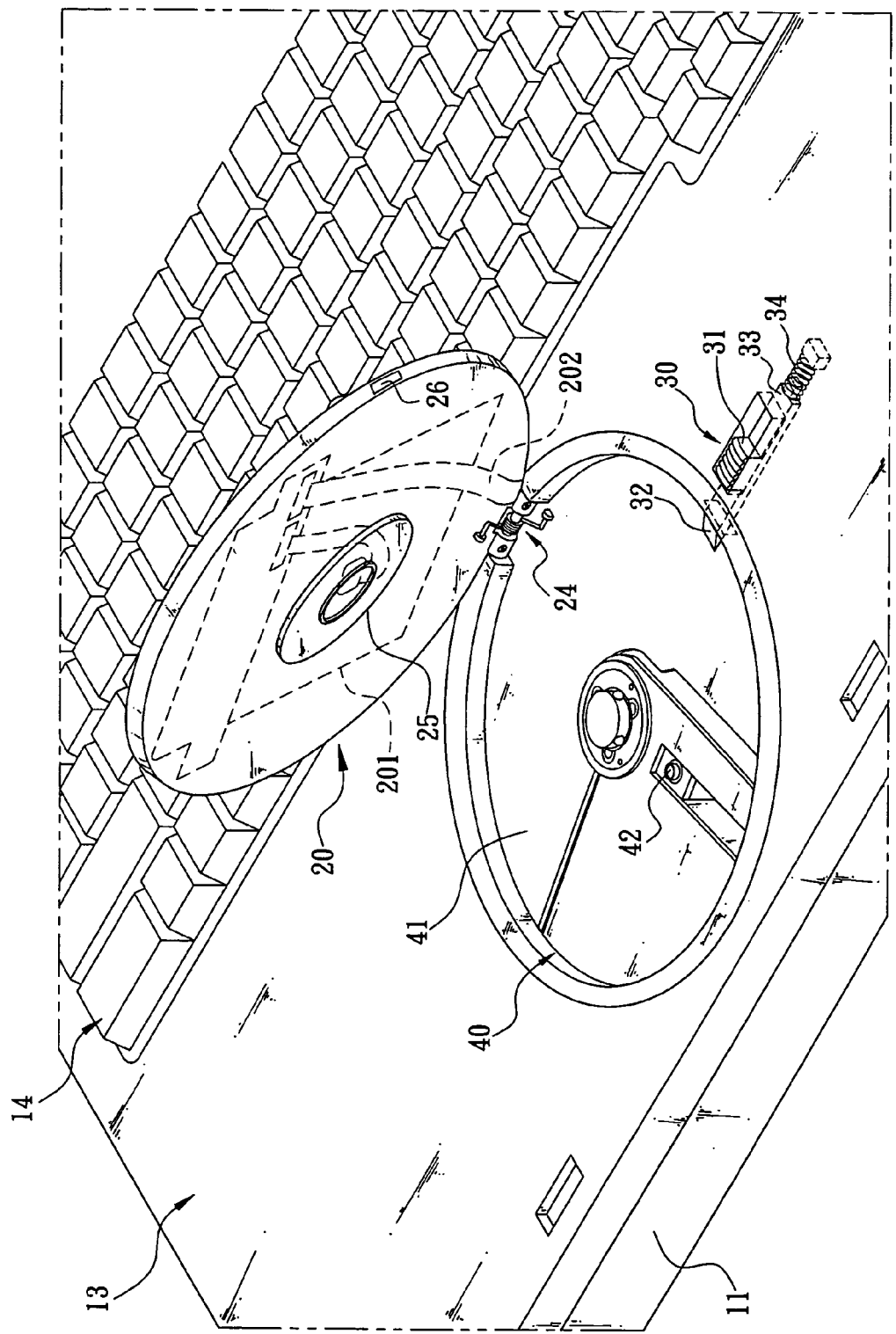
FIG. 2 is an enlarged view of the open touch pad assembly and adjacent area on the notebook.

Referring to FIGS. 1 and 2, there is shown a notebook having an arrangement for combining its touch pad and CD-ROM (or DVD-ROM) drive as a unit in accordance with the invention. The notebook comprises a display 10, a housing 11, and at least one pivot member (e.g., hinge) 12 coupled between the display 10 and the housing 11. In an inoperable position the display 10 is rested upon the housing 11. Alternatively, a user may pivot (i.e., open) the display 10 to position at an optimum angle with respect to the housing 11 by pivoting about the pivot member 12. A manipulating section 13 is formed on a top surface of the housing 11. A keyboard 14 is provided on the manipulating section 13 adjacent the pivot member 12. The keyboard 14 is implemented as a membrane keyboard in the embodiment. At least one input/output (I/O) port 15 is provided on one side of the housing 11. Each I/O port 15 is adapted to couple to a mouse or a flash drive (not shown) so that a pointer (e.g., cursor) on the screen can be manipulated for control and transferring data. The I/O port 15 is implemented as a USB (Universal Serial Bus) in the embodiment.

Referring to FIGS. 1 and 2 again, a touch pad assembly 20 is provided on the manipulating section 13 between the keyboard 14 and a forward end. The touch pad assembly 20 is an input device for manipulating the pointer on the screen of the display 10. The touch pad assembly 20 operates substantially the same as a mouse, a pointing stick (or called tracking stick), or a trackball. In the invention, the touch pad assembly 20 is circular and comprises a touch pad 21 occupying most portion of its surface, a first button 22, and an adjacent second button 23 (see FIG. 1). Another connecting member (e.g., hinge) 24 is provided at a bottom edge of the touch pad 21 for pivotably coupling the touch pad 21 to an annular recessed shoulder on the manipulating section 13 (see FIG. 2). A user can control the pointer on the display 10 by touching the touch pad 21 or pressing the first button 22 or the second button 23 to click an icon or an item of a menu shown on the display 10. A user may unlock a lock member 30 by disengaging it from a mated lock member 26 both provided adjacent an edge of the touch pad assembly 20. Thereafter, the user can pivot (i.e., open) the touch pad assembly 20 to position at an optimum angle with respect to the manipulating section 13 by pivoting about another connecting member 24.

Referring to FIG. 2 again, a CD-ROM (or DVD-ROM) drive 40 is provided under the touch pad assembly 20. A disc receiving cavity 41 of the CD-ROM drive 40 is exposed by opening the touch pad assembly 20 at a sufficient angle. A read/write head 42 is provided on a bottom of the CD-ROM drive 40. A CD (not shown) is adapted to snugly fit onto the disc receiving cavity 41. Next, close the touch pad assembly 20 onto the disc receiving cavity 41. A positioning plate 25 on a bottom of the touch pad assembly 20 is thus lowered to hold the CD in place. Thereafter, a reading of the CD can be performed.

Referring to FIG. 2 again, the mated lock member 26 is implemented as a hole and the lock member 30 is implemented as sliding lock in the embodiment. The mated lock member 26 and the lock member 30 are disposed correspondingly on the edge of the touch pad assembly 20. The sliding lock comprises a button 31 projected from a top surface of the manipulating section 13, an inclined end 32 facing the mated lock member 26, and the other end 33 urged against a resilient member (e.g., spring or elastic piece) 34. The ends 32 and 33 move rightward to compress the resilient member 34 when the touch pad assembly 20 pivots to close CD-ROM drive 40. Also, the inclined end 32 moves leftward into the mated lock member 26 (i.e., hole) by the expansion of the resilient member 34 for locking immediately after the CD-ROM drive 40 is closed by the touch pad assembly 20. In a rightward sliding of the sliding lock (i.e., the button 31) the inclined end 32 clears from the mated lock member 26 (i.e., hole) for unlocking the touch pad assembly 20. Next, open the touch pad assembly 20 to position at an angle with respect to the manipulating section 13 by pivoting (see FIG. 2). The constructions of both the mated lock member 26 and the lock member 30 described in the embodiment are not limitative, it is appreciated by those skilled in the art that other modifications or alternations thereof are made possible without departing from the scope and spirit of the invention.

In the embodiment, a touch control circuit board 21 is provided in the touch pad assembly 20 adjacent the positioning plate 25 (see FIG. 2). A cable 202 is extended from the touch control circuit board 21 into interior circuitry of the display 10 for sending information to the display 10 for showing.

By disposing the CD-ROM drive 40 under the touch pad assembly 20 by the invention, it is possible of eliminating the prior problems of hindering the opening of the CD-ROM drive 40 at one side of the housing 11 and/or damaging the same by the mouse, the cable, and the flash drive. Moreover, it can save precious internal space of the housing 11.

While the invention has been described by means of specific embodiments, numerous modifications and variations could be made thereto by those skilled in the art without departing from the scope and spirit of the invention set forth in the claims.

What is claimed is:

1. A notebook having a mechanism for combining a touch pad and a CD-ROM drive, comprising:

a display;

a housing including at least one pivot member coupled to the display, a manipulating section formed on a top surface of the housing, a keyboard provided on the manipulating section adjacent the pivot member, and at least one I/O port provided on one side of the housing;

a touch pad assembly provided on the manipulating section between the keyboard and a forward end of the housing, the touch pad assembly being circular and including a touch pad occupying a first portion, a first button occupying a second portion smaller than the first portion, and an adjacent second button occupying a third portion smaller than the first portion, and a second connecting member provided at an edge of the touch pad for pivotably coupling the touch pad to the manipulating section;

lock means including a first member provided in the touch pad assembly and a mated second member provided adjacent an edge of the touch pad assembly wherein the touch pad assembly is operative to pivot to position at an optimum angle with respect to the manipulating section by pivoting about the second connecting member; and a CD-ROM drive provided under the touch pad assembly and including an internal disc receiving cavity, the disc receiving cavity being exposed by opening the touch pad assembly at a predetermined angle, and a read/write head provided on a bottom of the CD-ROM drive wherein a CD is adapted to fit onto the disc receiving cavity prior to closing the touch pad assembly onto the disc receiving cavity.

2. The notebook of claim 1, wherein the first member of the lock means is a hole and is disposed in a position of the touch pad assembly corresponding to the second member of the lock means with the edge of the touch pad assembly passing therebetween.

3. The notebook of claim 2, wherein the second member of the lock means is a sliding lock and including a button projected from a top surface of the manipulating section, an inclined end facing the first member of the lock means, and a resilient member urged against the other end of the second member of the lock means.

4. The notebook of claim 1, further comprising a positioning plate provided on a bottom of the touch pad assembly wherein the positioning plate is adapted to lower to hold the CD in the disc receiving cavity in place.

5. The notebook of claim 4, further comprising a touch control circuit board provided in the touch pad assembly adjacent the positioning plate, the touch control circuit board having a cable extended therefrom into the display for sending information thereto for showing.

* * * * *